Inventor:
Thomas A. Vanderslice,
by Leo J. ———
His Attorney.

United States Patent Office

3,351,543
Patented Nov. 7, 1967

3,351,543
PROCESS OF COATING DIAMOND WITH AN ADHERENT METAL COATING USING CATHODE SPUTTERING
Thomas A. Vanderslice, Scotia, N.Y., assignor to General Electric Company, a corporation of New York
Filed May 28, 1964, Ser. No. 370,872
2 Claims. (Cl. 204—192)

This invention relates to a process and apparatus for cleaning and coating materials with strongly adherent coatings and more particularly to the use of glow discharge ion bombardment at relatively low temperatures to clean the surface of diamond crystals and to coat these cleaned crystalline surfaces with metal in a manner insuring strong bonding between the diamond surface and the metal coating.

Although the process described herein is equally applicable to other substances, as for example, cubic boron nitride crystals and aluminum oxide crystals, the advantages of this process are most clearly illustrated in connection with the coating of diamonds wherein the nature of the coated crystal requires operation at a relatively low temperature. In the case of diamond, the problem is that of graphitization of the diamond by exposure to elevated temperatures; i.e., at atmospheric pressure perceptible graphitization occurs at temperatures in excess of about 800° C.

In the manufacture of diamonds, as for example by the catalytic methods disclosed in U.S. 2,947,609, Strong, and U.S. 2,947,610, Hall et al., both of which are assigned to the assignee of this invention, in addition to making larger crystals having varied industrial uses, many diamond crystals of very small size are produced. These small particles of diamond are of limited use and it is generally recognized that the commercial value of these particles can be substantially increased by joining a large number of smaller particles together into a conglomerate mass of sufficient size, toughness, hardness and cohesiveness.

A diamond compact is a cluster of diamond crystals bonded together either in self-bonded relationship or by means of some bonding medium disposed between the crystals or by some combination of the aforementioned bonding mechanisms. Such a compact is composed of diamond particles arranged in random orientation and as a result any cleavage of the compact will not occur along a single cleavage plane as would be the case with a single crystal but must follow a tortuous course dictated by the cleavage directions of the individual randomly oriented particles. Obviously a higher stress is required to cause this latter type of cleavage. Also, random disposition of these small particles provides a cutting surface that is self sharpening.

Such a compact or conglomerate diamond mass can then be affixed to a work piece for any of a variety of industrial erosive operations. The utility of such a diamond compact depends primarily on the strength of the bond holding the individual diamond particles in place relative to the rest of the mass of diamond particles.

One mechanism for successfully producing diamond compacts has involved the steps of: coating the individual diamond particles with a bonding material, usually a metal, and then joining the coated diamond particles into a conglomerate mass by the use of a solder to serve as a bonding agent between adjacent metal coatings. Although this approach is theoretically feasible, one of the very serious obstacles for the successful manufacture of compacts in the aforementioned manner has been the unreliability of the methods previously employed in the prior art for applying the initial coat to the diamonds in a manner yielding the requisite strong bond between the diamond surface and the coating material.

By the practice of this invention a specific glow discharge technique is employed whereby at temperatures below the graphitization temperature of diamond, diamond crystals are first cleaned; when sufficient cleaning has been effected, a coating metal is deposited over the surfaces of the diamond crystals so cleaned during continued conduct of the cleaning step and as a result a strong diamond-to-metal bond is produced between crystal and coating. Once this secure bond affixing the coating material to the diamond surface has been effected, ordinary soldering or brazing techniques can be applied to join the completely coated diamond particles into a compact.

It is therefore an object of this invention to provide a low temperature process for applying a coating material in a manner productive of a strong bond between the substrate and the coating material.

It is another object of this invention to provide a process and apparatus for coating diamonds with metal by gas discharge sputtering in a manner insuring the elimination of surface impurities from the diamond during the coating process without causing graphitization of the diamond.

A further object of this invention is the provision of a process and apparatus for cleaning the surface of diamond crystals by the use of glow discharge ion bombardment to insure preparation of the surface for secure bonding of the coating material to the surface by a combination of mechanical and physical agencies and insuring the continued elimination of impurities from the diamond crystal surface during the coating operation without causing graphitization of the diamond crystals.

It is still a further object of this invention to provide a process and apparatus for cleaning and coating diamonds without exposing the cleaned diamonds to contaminating influences in the interim between the initial cleaning and coating operation and with the overall cleaning and coating process being conducted at a temperature below about 800° C.

In general, the above-noted objects are secured (employing diamonds as the illustrative substrate material) by placing one or more diamonds to be coated on a first electrode in a bell jar wherein a second electrode of a readily sputterable material is also located, such as molybdenum, tungsten, tantalum or aluminum, these first and second electrodes being selectively connectable together electrically; utilizing a third electrode in the bell jar as an anode to effect glow discharge between this third electrode and either or both of the first and second electrodes; evacuating the bell jar to a pressure of about $10^{-5}$ mm. Hg; introducing to the bell jar an inert gas atmosphere at low pressure but in sufficient concentration to sustain a glow discharge; initiating a glow discharge between the first electrode as cathode and the third electrode as anode to effectively remove surface contaminants from the diamond material by positive ion bombardment; connecting the second electrode into the circuitry at cathode potential during continued conduct of the cleaning step whereby a portion of the glow discharge and consequent ion bombardment is directed against the second electrode sputtering metallic particles therefrom, which particles fall upon and adhere to the surface of the diamond material during continuation of the surface purging operation by that portion of the glow discharge directed toward the first electrode; continually adjusting the relative potentials of the first and second electrodes whereby the rate of deposition of metal is made progressively greater than the rate of removal of metal; discontinuing the glow discharge after a sufficiently thick coating has been deposited upon the diamond material and removing the coated diamond material from the bell jar.

Other objects and features of the invention will become apparent to those skilled in the art as the disclosure is made in the following detailed description of a preferred embodiment of the invention as illustrated in the accompanying sheet of drawing in which.

Figure 1:
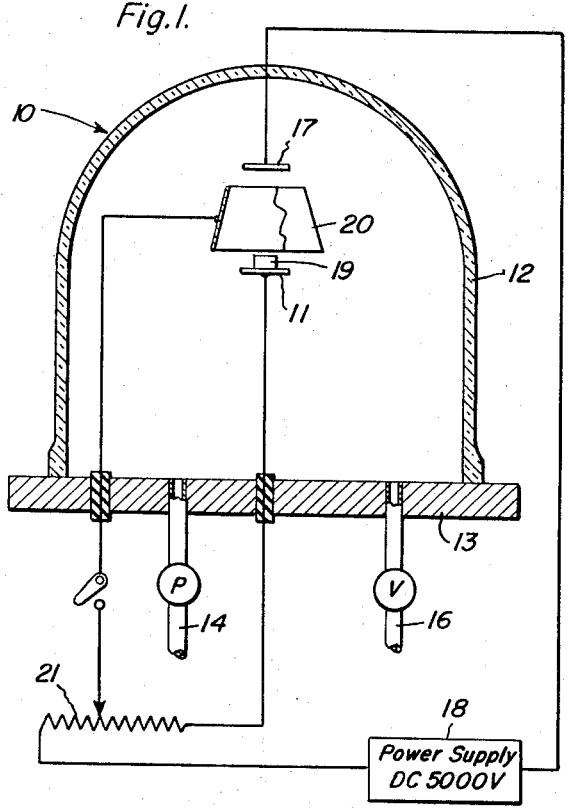
FIG. 1 is a schematic representation of the gas discharge apparatus.

In the conduct of the process of this invention one or more diamonds are placed in a container within the gas-discharge apparatus 10 upon a metal plate 11 which is connected as a cathode in the circuitry shown. Bell jar 12 after being placed in sealing engagement with the surface of support 13 is evacuated via pipe 14 by a vacuum pump (not shown) to a pressure of about $10^{-5}$ mm. of Hg. After evacuation a gas, such as argon (or helium or krypton), that will not be adsorbed appreciably by the surfaces of material within the bell jar 12 is admitted through pipe 16 for use as the main glow discharge gas. Other gases, as for example nitrogen, could be used if they are not adsorbed appreciably by the particular materials under test.

Sufficient argon is admitted into bell jar 12 to exert a pressure of about 30 microns. At this pressure, a voltage differential of 2000 volts is impressed between anode 17 and cathode 11 by D.C. power supply 18. With this 2000 volt cathode-anode voltage, gas-discharge currents of about 60 ma. are produced, which cause cathode 11 to be bombarded by ions having very high kinetic energies. The particular value of the kinetic energy depends upon the given cathode, gas pressure, etc., but for normal metal cathodes the kinetic energy is in the order of several hundred volts. These high-velocity ions strike the diamond material in container 19 resting upon cathode 11 dislodging from the surface of the diamond material any gas particles adsorbed thereon or any oxide coating present thereon as these ions head toward the surface of the cathode. Thus, although diamond is a relatively poor electrical conductor, the bombarding ions can be directed there against as a result of the orientation of the electrodes and surface conduction of the diamond.

The number of ions combarding the diamond material and their velocity will be determined by the potential assumed by the diamond surface based on the secondary emission ratio. Thus, if a larger number of electrons are dislodged from the surface of the diamond material than the number of rebounding ions a net positive charge will build up on the surface of the diamond material. The greater this positive charge, the more the bombarding ions will be slowed down as they approach the positively-charged surface.

If there is no surface conductance present the number of ions arriving at the diamond material will be equal to the number of electrons arriving. Since the diamond material is placed upon a conducting metal plate 11, as the surface conductance increases, the number of ions striking the diamond also increases.

In contrast to electron bombardment by electron emission, ion bombardment by glow discharge does not require or generate high operating temperatures, if the current density is kept low. In the instant process therefore, the material being coated can be kept at relatively low temperatures. Also, the momentum of ions bombarding the surface is many times greater than would be the momentum of electrons. Thus even a tightly bound oxide coating is easily removed from the surface of a diamond crystal without causing graphitization.

During the process of ion bombardment by glow discharge, if it is desired to coat the entire surface of the diamond crystals, it is advantageous to agitate cathode 11 to insure that the entire surface of the diamond material is exposed for a sufficiently long period to the bombardment of ions in order to effect complete cleaning thereof.

Once the surface of the diamond material in container 19 and of cathode 11 have been purged of adsorbed gas and other materials, the diamond material is ready for the application of the coating material, in this case a metal film.

The metal comprising this film or coating can be supplied within bell jar 12 either by the well-known process of evaporation or by sputtering particles of metal by ion bombardment from auxiliary electrode 20. The metal liberated by either of the above methods within bell jar 12 settles over all the surfaces within the enclosure, including the diamond material to which the metal adheres securely due to the very clean condition of the diamond.

The preferred method of supplying the metal for this metal coating is by sputtering, however, whatever mechanism is employed for the introduction of the coating metal within bell jar 12 a most important feature of this invention is the recognition that bombardment of the substrate material with ions must be continued during the metallizing operation in order to continually purge the surface thereof to prevent the contamination of the surface by gas present within bell jar 12.

If the background impurity gas pressure is very low (less than $10^{-8}$ mm. Hg) then it is a simple matter to remove adsorbed gases from the surface of the cathode by thorough ion bombardment after which the surface will remain clear as long as the bombardment continues. Normally, however, in the coating of diamond material the residual gas pressure and/or the impurity level in the introduced inert gas is high enough so that the cleaned surface of the diamond material will very quickly become covered with a layer of adsorbed gas. For example, at impurity background gas pressures of $10^{-5}$ mm. Hg, there are approximately 10 monolayers of gas striking the surface per second. Therefore, in less than a second, any exposed clean surface would become contaminated in the absence of continued ion bombardment. When the ion bombardment is continued during the metallizing step, as is indicated by the test results set forth herein, the bond between the metal coating and the surface of the diamond material is of superior quality. If, on the contrary, the bombardment of the diamond material is momentarily interrupted after the cleaning operation while the metal is being sputtered on the surface, the deposited metal fails to bond to the surface of the diamond material although a layer will deposit around each crystal. However, it is but a simple matter to separate this metal replica of the diamond surface therefrom because the bond is very poor.

In any given operation, therefore, it is but a simple matter to adjust the potential of the auxiliary or sputtering, electrode 20 relative to the cathode 11 by means of rheostat 21 whereby the rate of ion bombardment of the diamond material is kept high enough to purge adsorbed gas molecules from the surface thereof while the metallizing operation effected by the sputtering of auxiliary electrode 20 is made to proceed at a still higher rate. In this manner, the rate of arrival of metal atoms or particles to the surface of the diamond material can be set at a value greater than the rate of removal of the metal therefrom by the purging bombardment of ions supplied by the glow discharge between anode 17 and cathode 11.

In a typical metallizing operation employing the arrangement of apparatus displayed in FIG. 1, an argon pressure of about 30 microns is established within bell jar 12 and the cathode-anode voltage is about 2000 volts producing gas-discharge currents of about 60 milliamps. After a cleaning period of about one hour, switch 22 is closed connecting sputtering electrode 20 into the circuitry at cathode potential. Upon being connected into the circuitry a glow discharge is established between the anode 17 and electrode 20 causing the impingement of ions upon the surface of electrode 20. This ion bombardment of electrode 20 causes the sputtering or the literal "knocking off" of very small particles of metal from the surface of electrode 20, which particles of metal deposit upon, adhere to and coat the surface of the diamond material. The rate of deposition of metal removed by the sputtering of the surface of electrode 20 relative to the rate of removal of the metal from the diamond surface by the continued ion bombardment of diamond material can be adjusted by making the cathode 11 slightly more positive than the potential of auxiliary electrode 20 to insure a net buildup of metal on the surface of the diamond material. During the metallizing operation, cathode 11 should be jarred or moved sufficiently to cause the particles of the diamond material to reorient themselves so that all of the surfaces of the diamond material will be exposed to the metal deposition. Simply by adjusting the rheostat 21, cathode 11 may be made continually even more positive as the metallizing operation proceeds whereby the rate of removal of sputtered metal from the surface of the diamond material decreases and simultaneously the sputtering of metal from electrode 20 increases thereby increasing the rate of deposition of metal upon the surface of the diamond material. Such action will result in the buildup of a thicker metal film or coating. It may readily be appreciated that the rate of change of the rheostat setting may be automated or programmed as desired.

Diamond particles coated with a well-bonded metal, particularly as deposited by practice of this invention, may be coordinated into a conglomerate mass by the use of ordinary relatively low temperature soldering or brazing techniques using metals or alloys particularly compatible with the metal coating applied to the diamond particles. Such brazing metal-coating metal combinations are described in S.N. 371,103, Hull et al. filed concurrently herewith and assigned to the assignee of this invention.

Although the preceding text has described only the application of a single coating material to a substrate material, it may be appreciated that it may be advantageous to coat a metallic first coating with a second coating, i.e., a coating of braze metal in order to promote contact of the braze metal with the initial coating. In the case of diamonds, for example, an initial coating of molybdenum over the diamond material can be covered with copper in the aforementioned manner. Thereafter, the brazing operation is relatively simple, i.e., a quantity of the doubly-coated diamonds may be simultaneously compressed at a pressure of about 5000 atmospheres and heated in a controlled environment to promote sintering or melting of the copper.

The integrity of the diamond-to-metal bond has been established both by microscopic examination and by actual test; the thickness of the film or coating was measured by scratching through the metal film and observing the fringe displacement across the scratch in an interference microscope. White light was ordinarily used and gave a fringe spacing of $0.3\mu = 3000$ A.$= 11.8$ microinches. Normally fringe displacements of $\frac{1}{10}$ fringe of 300 A. were observable with the equipment available, provided the background surface was polished. In those instances in which the sputtering voltage was not manipulated to enable the application of thicker metal films, it was determined that the metal thickness was less than 300 A. Such films are nearly invisible and one may look into the diamond through the film. Coating thickness measurements in those coating operations in which current control on the sputtering electrode 21 was employed were found to be of magnitude ranging from about 580 A. to about 2000 A. thick.

Although the temperature within the bell jar 12 has been generally referred to as below 800° C. the temperature can be maintained at some lower value by operating with a lower current density. Thus, the temperature may be maintained in any desirable temperature range depending on the criticality of the temperature exposure of the materials involved. Temperatures below ambient require external cooling (not shown) with water, liquid nitrogen or the like piped in from the outside to the sample holder.

Pressures within the bell jar 12 may vary from 1 micron to about 300 microns so long as the gas phase current is properly adjusted thereto. Thus, at the higher end of this pressure range a higher current density would be required than at pressures at the lower end of this range. As has been mentioned above, at any given background pressure some corresponding number of monolayers of gas will strike the diamond surface per second. As long as the current density is kept at a value such that the number of bombarding ions striking any increment of surface area is about 10 times the number of gas molecules reaching this same incremental area (predictable from knowledge of the background pressure in bell jar 12) the cleaning will be effective. As an upper limit the voltage applied between anode 17 and cathode 11 during cleaning or between anode 17 and cathode 20 during sputtering will be that value which would cause an arc discharge between electrodes.

Time of exposure will, of course, vary with the substrate material, the coating material, the desired coating thickness and the operating parameters. In some instances a few minutes of exposure will suffice, however, with material coatable with greater difficulty a total of several hours of exposure may be required.

The presence of impurities can be minimized by employing a glow discharge gas of low impurity content. Such a gas, which is readily available in commerce, would be welding grade argon. This gas contains less than 1% impurity content.

Although this invention has been described as entailing evacuation of the bell jar 12 to a very low pressure, an alternate method for reducing the impurity content therein is to continuously flush the interior of the bell jar 12 at about the operating pressure with a low impurity gas.

In the case of thin molybdenum films applied to diamonds in the above-described manner, it was found that these films are much harder than ordinary rods or sheets of molybdenum, for some unexplained reason.

Testing of the strength of the bond between the coating material and the diamond surface when applied in the above-described fashion has been accomplished in the following manner. First, a test sample 26 was prepared comprising an octahedral diamond 27 coated with molybdenum by the glow discharge technique and then copper-brazed to the end of a molybdenum rod 28 in a dry hydrogen atmosphere. The brazing was accomplished by placing a piece of copper foil on the molybdenum rod 28 and heating to melt the copper. Rod 28 with the melted copper thereon was cooled and the molybdenum-coated diamond 27 was centered on the copper deposit on the end of rod 28. Subsequent reheating of rod 28 served to braze the molybdenum-coated diamond 27 to the molybdenum rod 28 by means of the film of copper between these two elements. No force in addition to the force of gravity was employed to urge the diamond against the rod during the brazing operation. The temperature was carefully controlled and the brazing was quickly executed in order to insure preservation of the thin molybdenum coating of the diamond 27.

Figure 2:
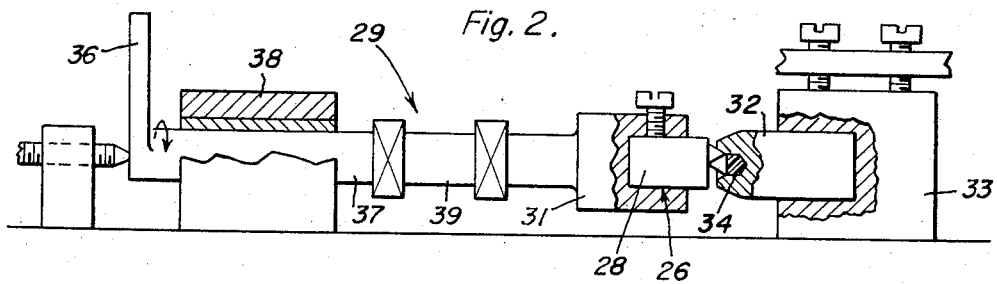
FIG. 2 is a schematic representation of the torsion apparatus employed to test the value of the diamond-to-metal bond.
Figure 2A:
FIG. 2a is a separate enlarged view of the test sample.

The resulting test sample as shown in FIG. 2a is shown mounted in test position in the apparatus 29 in FIG. 2. As shown therein, test sample 26 is mounted in chuck 31. A brass rod 32 is rigidly mounted in support 33 and has a socket 34 formed in the distal end thereof. A portion of diamond 27 is cemented solidly within socket 34 by the use of epoxy cement and with the other portion of diamond 27 secured in the above-described fashion, a pure torque may be applied to the diamond-metal bond by exerting a known force to the torque arm 36 affixed to shaft 37, which is shown mounted in bearing 38. This torque application is transmitted from shaft 37 to chuck 31 via double universal joint 39 to correct for minor misalignment and is increased until failure occurs between diamond 27 and rod 28. Such failure may occur by breaking through the diamond 27 itself, by failure of the bond between the diamond and the metal coating and in many instances by breaking with part of the break being in the diamond and part of the break being between the metal coat and the diamond.

After each failure, both faces of the break were photographed, the break area was measured and breaking stress calculations were made. Table 1 shows the results of some bond tests made in the apparatus schematically illustrated in FIG. 2. The gas-discharge coating technique empolyed in Test No. 7 differed from the other tests in that after molybdenum was sputtered over the test diamond, a layer of copper was sputtered over the molybdenum employing the same coating technique.

TABLE 1

| Test No. | Solder | Corrected Torque (in.-lb.) | Area (in.²) | Average Stress (lb./in.²) |
|---|---|---|---|---|
| 1 | Cu to Mo | 1.99 | .00468 | 14,200 |
| 2 | Cu to Mo | 1.39 | .0037 | 16,200 |
| 3 | Cu to Mo | 7.37 | .0036 | 77,800 |
| 4 | Cu to Mo | 4.77 | .00485 | 31,200 |
| 5 | Cu to Mo | 3.84 | .00492 | 25,000 |
| 6 | Cu to Mo | 4.69 | .00297 | 65,800 |
| 7 | {Mo plus Cu / Cu to Mo} | 5.23 | .00417 | 44,400 |
| 8 | Cu to Mo | 4.90 | .00159 | 176,000 |

Thus, by the use of the novel process described herein in the apparatus illustrated and described, a bond of reliable structural integrity can now be produced between a diamond surface and a metal layer applied thereto. This process is particularly useful in enabling the successful completion of the preliminary step in the assembly of multiple small man-produced diamonds into sizeable compacts sufficiently large to replace natural diamonds in single point tools, drills, well bits, etc.

Although the above description has been directed to the deposition of a coating completely around a diamond crystal, the process is broadly applicable to the coating in part or in whole of substances wherein the creation of a strong reliable intermetallic layer between substrate and metallic layer has been found to be very difficult or impossible, wherein the chemical nature of the materials to be joined is not readily conducive to the creation of a chemical-type bond and wherein any substantial elevation in the temperature of the substrate must be avoided to prevent the destruction or damage thereof. Such a set of conditions may apply, for example, in the connection of terminals to certain semiconductors. In a case of this nature it is desirable to be able to strongly bond a patch of metal to a small portion of the surface of a semiconductor with the aforementioned method whereby a terminal can later be joined to the semiconductor by brazing or soldering. In this manner high temperatures which can be expected to change the semiconducting properties of the substrate can be avoided.

Further, a layer of catalyst metal for graphite to diamond conversion as described in U.S. 2,947,610 may be applied to the surface of a diamond, which can then be subjected in the presence of graphite to diamond conversion conditions to increase the size of the diamonds.

The success of this coating process whereby it is productive of such strong bonds is due in part to the strong physical attraction promoted between the consistently cleaned substrate surface and the deposited metal coating and in part to the aspect of this process whereby freedom is maintained from the generation of excess heat. In the case of diamond this latter aspect is particularly important in order to avoid graphitization of the diamond surface. Such graphitization has been proven to have been responsible in the past for the poor metal-to-diamond bond produced in metal coating operations for diamonds.

Obviously, many modifications and variations of the present invention are possible in the light of the above teachings. It is therefore, to be understood, that within the scope of the appended claims, the invention may be practiced otherwise than as specifically described, that is, the coating of solid materials in general is contemplated and in regard to diamonds, the coating of natural as well as man-produced diamonds may be achieved.

What I claim as new and desire to secure by Letters Patent of the United States is:

1. In a process for cleaning crystalline material by glow discharge ion bombardment and coating said crystalline material with metal, during which process said crystalline material is located on a first cathode in an evacuated chamber and said crystalline material is exposed to the scrubbing action of gas ions impinging thereon during glow discharge established between an anode located spaced from said first cathode and said first cathode, after which a second cathode and said first cathode both receive gas ion impingement thereon, said first cathode being at a more positive potential than said second cathode, whereby metal particles are dislodged from said second cathode and deposited upon said crystalline material during continuing cleaning thereof, the improvement comprising the steps of:
    (a) using diamond crystals as the crystalline material and
    (b) continually adjusting the relative potentials of said first and second cathodes to render said first cathode progressively more positive relative to said second cathode.

2. The improvement substantially as recited in claim 1, wherein the second cathode is of molybdenum.

References Cited

UNITED STATES PATENTS

| | | | |
|---|---|---|---|
| 3,325,393 | 6/1967 | Darrow et al. | 204—192 |
| 2,886,502 | 5/1959 | Holland | 204—298 |
| 3,271,285 | 9/1966 | Skoda | 204—298 |
| 2,382,666 | 8/1945 | Rohrig et al. | 75—226 |
| 2,505,370 | 4/1950 | Sykes | 204—192 |
| 3,021,271 | 2/1962 | Wehner | 204—192 |

FOREIGN PATENTS

| | | |
|---|---|---|
| 939,275 | 10/1963 | Great Britain. |
| 1,294,562 | 4/1962 | France. |
| 779,347 | 7/1957 | Great Britain. |

OTHER REFERENCES

Wehner, Advances in Electronics and Electron Physics, vol. VII, 1955, Academic Press, Inc. Pub. New York, p. 253.

ROBERT K. MIHALEK, *Primary Examiner.*

JOHN H. MACK, *Examiner.*